United States Patent
Chun

(10) Patent No.: US 10,320,024 B2
(45) Date of Patent: Jun. 11, 2019

(54) ELECTRODE ASSEMBLY AND SECONDARY BATTERY INCLUDING THE SAME

(71) Applicant: SAMSUNG SDI CO., LTD., Yongin-si, Gyeonggi-do (KR)

(72) Inventor: Kwan-Sic Chun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 306 days.

(21) Appl. No.: 14/645,280

(22) Filed: Mar. 11, 2015

(65) Prior Publication Data

US 2015/0295270 A1 Oct. 15, 2015

(30) Foreign Application Priority Data

Apr. 9, 2014 (KR) ........................ 10-2014-0042531

(51) Int. Cl.
*H01M 10/04* (2006.01)
*H01M 2/26* (2006.01)
*H01M 4/64* (2006.01)

(52) U.S. Cl.
CPC ..... *H01M 10/0431* (2013.01); *H01M 10/0422* (2013.01); *H01M 2/26* (2013.01); *H01M 4/64* (2013.01)

(58) Field of Classification Search
CPC ......... H01M 10/0431; H01M 10/0422; H01M 2/26; H01M 4/64

(Continued)

(56) References Cited

U.S. PATENT DOCUMENTS

2011/0104539 A1 5/2011 Oh et al.
2011/0129708 A1* 6/2011 Doo ...................... H01M 2/022
429/94

(Continued)

FOREIGN PATENT DOCUMENTS

JP 2010-055906 A 3/2010
KR 10-2009-0085966 A 8/2009

(Continued)

OTHER PUBLICATIONS

English machine translation of Japanese Publication No. JP 2010-055906, dated Mar. 11, 2010, 23 pages.

*Primary Examiner* — Cynthia H Kelly
*Assistant Examiner* — Rashid A Alam
(74) *Attorney, Agent, or Firm* — Lewis Roca Rothgerber Christie LLP

(57) ABSTRACT

An electrode assembly includes: a positive electrode plate including a positive electrode collector having, on its first side, a positive electrode coating portion having a positive electrode active material thereon and a first positive electrode non-coating portion; a positive electrode tab on the first positive electrode non-coating portion; a negative electrode plate including a negative electrode collector having, on its first side facing the first side of the positive electrode collector, a negative electrode coating portion having a negative electrode active material thereon and a first negative electrode non-coating portion; and a separator between the positive and negative electrode plates. The first positive electrode non-coating portion is between ends of the positive electrode plate, and the first negative electrode non-coating portion overlaps the first positive electrode non-coating portion.

19 Claims, 4 Drawing Sheets

(58) Field of Classification Search
USPC .......................................................... 429/94
See application file for complete search history.

(56) References Cited

U.S. PATENT DOCUMENTS

| | | | | |
|---|---|---|---|---|
| 2011/0151295 A1* | 6/2011 | Kim | ...................... | H01M 2/263 |
| | | | | 429/94 |
| 2012/0009450 A1 | 1/2012 | Chun | | |
| 2012/0321924 A1* | 12/2012 | Ahn | ...................... | H01M 2/022 |
| | | | | 429/94 |
| 2013/0260203 A1* | 10/2013 | Yoshida | .................. | H01M 2/22 |
| | | | | 429/94 |
| 2013/0316207 A1* | 11/2013 | Suwa | .................... | H01M 10/05 |
| | | | | 429/94 |
| 2014/0072877 A1* | 3/2014 | Araki | ...................... | H01M 4/66 |
| | | | | 429/233 |
| 2014/0302366 A1* | 10/2014 | Sugita | ............... | H01M 10/0587 |
| | | | | 429/94 |

FOREIGN PATENT DOCUMENTS

| | | | |
|---|---|---|---|
| KR | 10-2012-0006389 A | 1/2012 | |
| WO | WO 2013038701 A1 * | 3/2013 | ........ H01M 10/0587 |

\* cited by examiner

ELECTRODE ASSEMBLY AND SECONDARY BATTERY INCLUDING THE SAME

CROSS-REFERENCE TO RELATED APPLICATION

This application claims priority to and the benefit of Korean Patent Application No. 10-2014-0042531, filed on Apr. 9, 2014 in the Korean Intellectual Property Office, the disclosure of which is incorporated herein in its entirety by reference.

BACKGROUND

1. Field

Aspects of one or more embodiments of the present invention are directed toward an electrode assembly and a secondary battery including the electrode assembly.

2. Description of the Related Art

Unlike primary batteries, secondary batteries are configured to be recharged, and the use of secondary batteries is encouraged owing to economical and eco-friendly aspects thereof.

According to the shapes of battery cases, secondary batteries may be classified as a cylinder-type secondary battery in which an electrode assembly is disposed in a cylindrical metal can, a prismatic-type secondary battery in which an electrode assembly is disposed in a prismatic metal can, and a pouch-type secondary battery in which an electrode assembly is disposed in a pouch case formed of an aluminum laminate sheet.

Electrode assemblies, each including positive and negative electrodes (e.g., positive and negative electrode sheets) coated with active materials with a separator between the positive and negative electrodes, may be disposed in battery cases. The separator for insulating the positive and negative electrodes from each other may shrink or deform after or while being heated, and in this case, the positive and negative electrodes may be brought into physical contact with each other and short-circuited. Therefore, accidents such as burning or explosions of secondary batteries may occur.

SUMMARY

Aspects of one or more embodiments of the present invention are directed toward an electrode assembly having improved safety and a secondary battery including the electrode assembly.

Additional aspects will be set forth in part in the description which follows and, in part, will be apparent from the description or may be learned by practice of the presented embodiments.

According to an embodiment of the present invention, an electrode assembly includes: a positive electrode plate including a positive electrode collector having a positive electrode coating portion and a first positive electrode non-coating portion at a first side thereof, the positive electrode coating portion having a positive electrode active material thereon, the first positive electrode non-coating portion being an exposed portion of the positive electrode collector; a positive electrode tab coupled to the first positive electrode non-coating portion; a negative electrode plate including a negative electrode collector having a negative electrode coating portion and a first negative electrode non-coating portion at a first side thereof, the negative electrode coating portion having a negative electrode active material thereon and facing the first side of the positive electrode collector, the first negative electrode non-coating portion being an exposed portion of the negative electrode collector; and a separator between the positive electrode plate and the negative electrode plate, wherein the first positive electrode non-coating portion is offset from ends of the positive electrode plate along a length direction of the positive electrode plate, and the first negative electrode non-coating portion overlaps the first positive electrode non-coating portion.

A width of the first positive electrode non-coating portion along the length direction of the positive electrode plate may be less than a width of the first negative electrode non-coating portion along a length direction of the negative electrode plate.

The positive electrode tab may include copper.

The positive electrode plate may further include a second positive electrode non-coating portion and a third positive electrode non-coating portion at opposite ends of the positive electrode plate, respectively, along the length direction of the positive electrode plate, the negative electrode plate may further include a second negative electrode non-coating portion and a third negative electrode non-coating portion that overlap the second positive electrode non-coating portion and the third positive electrode non-coating portion, respectively, and negative electrode tabs are coupled to the second and third negative electrode non-coating portions, respectively.

The positive electrode tab may protrude from the electrode assembly in a direction that is opposite to a direction in which the negative electrode tabs protrude from the electrode assembly.

The positive electrode plate, the separator, and the negative electrode plate may be wound together in a jelly-roll shape, and the electrode assembly may further include a center pin at a center of the jelly-roll shape.

A second side of the positive electrode collector may have the positive electrode active material thereon, and a second side of the negative electrode collector may have the negative electrode active material thereon.

A distance from one of the ends of the positive electrode plate to a center of the first positive electrode non-coating portion may be about ⅓ to about ⅔ the length of the positive electrode plate.

According to another embodiment of the present invention, a secondary battery includes: an electrode assembly including a positive electrode plate, a negative electrode plate, and a separator between the positive electrode plate and the negative electrode plate; a can accommodating the electrode assembly; and a cap assembly coupled to an upper side of the can, wherein the positive electrode plate includes a positive electrode collector having a positive electrode coating portion and a first positive electrode non-coating portion at a first side thereof, the positive electrode coating portion having a positive electrode active material thereon, the first positive electrode non-coating portion being an exposed portion of the positive electrode collector, wherein the negative electrode plate includes a negative electrode collector having a negative electrode coating portion and a first negative electrode non-coating portion at a first side thereof facing the first side of the positive electrode collector, the negative electrode coating portion having a negative electrode active material thereon, the first negative electrode non-coating portion being an exposed portion of the negative electrode collector, wherein the first negative electrode non-coating portion overlaps the first positive electrode non-coating portion, a positive electrode tab is coupled to the first positive electrode non-coating portion, and the first negative electrode non-coating portion has a width that is greater than a width of the first positive electrode non-coating portion.

The first positive electrode non-coating portion may be between ends of the positive electrode plate along a length direction of the positive electrode plate.

A distance from one of the ends of the positive electrode plate to a center of the first positive electrode non-coating portion may be about ⅓ to about ⅔ the length of the positive electrode plate.

The positive electrode plate, the separator, and the negative electrode plate may be wound together in a jelly-roll shape, and the secondary battery may further include a center pin at a center of the jelly-roll shape.

The positive electrode tab may include copper.

The positive electrode plate may further include a second positive electrode non-coating portion and a third positive electrode non-coating portion at opposite ends of the positive electrode plate, respectively, along a length direction of the positive electrode plate, the negative electrode plate may further include a second negative electrode non-coating portion and a third negative electrode non-coating portion that overlap the second positive electrode non-coating portion and the third positive electrode non-coating portion, respectively, and negative electrode tabs may be coupled to the second and third negative electrode non-coating portions, respectively.

The secondary battery may further include: an upper insulator at an upper side of the electrode assembly; and a lower insulator at a lower side of the electrode assembly.

The positive electrode tab may protrude from the electrode assembly in a direction that is opposite to a direction in which the negative electrode tabs protrude from the electrode assembly.

The positive electrode tab may be coupled to the cap assembly through the upper insulator, and each of the negative electrode tabs may be coupled to the can through the lower insulator.

A second side of the positive electrode collector may have the positive electrode active material thereon, and a second side of the negative electrode collector may have the negative electrode active material thereon.

The can may have a cylindrical shape.

BRIEF DESCRIPTION OF THE DRAWINGS

These and/or other aspects will become apparent and more readily appreciated from the following description of embodiments, taken in conjunction with the accompanying drawings in which.

DETAILED DESCRIPTION

Figure 1:
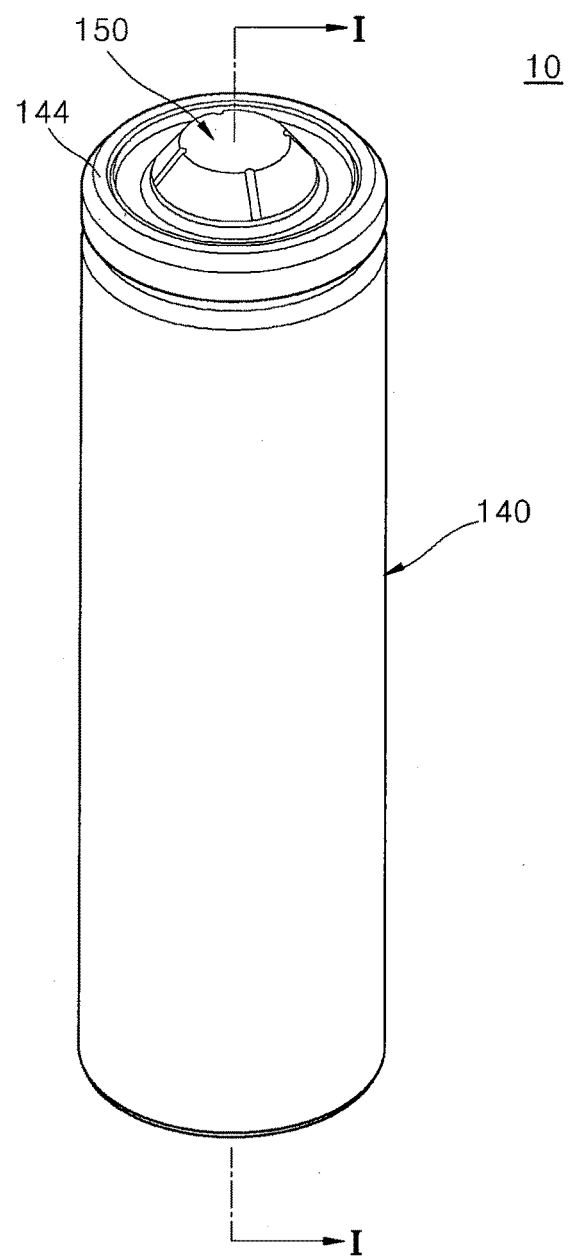
FIG. 1 is a schematic perspective view illustrating a secondary battery according to an embodiment of the present invention.

Reference will now be made in detail to embodiments, examples of which are illustrated in the accompanying drawings. Aspects and characteristics of the embodiments and implementation methods thereof will be clarified through the following descriptions given with reference to the accompanying drawings. In this regard, the embodiments may have different forms and should not be construed as being limited to the descriptions set forth herein. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present invention will be described in detail with reference to the accompanying drawings. In the drawings, like reference numerals denote like elements, and overlapping descriptions thereof will be omitted.

In the following descriptions of the embodiments, although the terms "first" and "second" are used to describe various elements, these elements should not be limited by these terms. These terms are only used to distinguish one element from another element.

In the following descriptions of the embodiments, the terms of a singular form may include plural forms unless referred to on the contrary.

In the following descriptions of the embodiments, the meaning of "include," "comprise," "including," or "comprising," specifies a property, a region, a fixed number, a step, a process, an element, and/or a component but does not exclude other properties, regions, fixed numbers, steps, processes, elements, and/or components.

It will be understood that when a film, a region, or an element is referred to as being "above" or "on" another film, region, or element, it can be directly on the other film, region, or element or intervening films, regions, or elements may also be present. Further, when a first element is being described as "coupled" or "connected" to a second element, the first element may be directly coupled or connected to the second element or may be indirectly coupled or connected to the second element via one or more intervening elements. Even further, the use of "may" when describing embodiments of the present invention relates to "one or more embodiments of the present invention."

In the drawings, the sizes of elements may be exaggerated for clarity. For example, in the drawings, the size or thickness of each element may be arbitrarily shown for illustrative purposes, and thus, the present invention should not be construed as being limited thereto.

Figure 2:
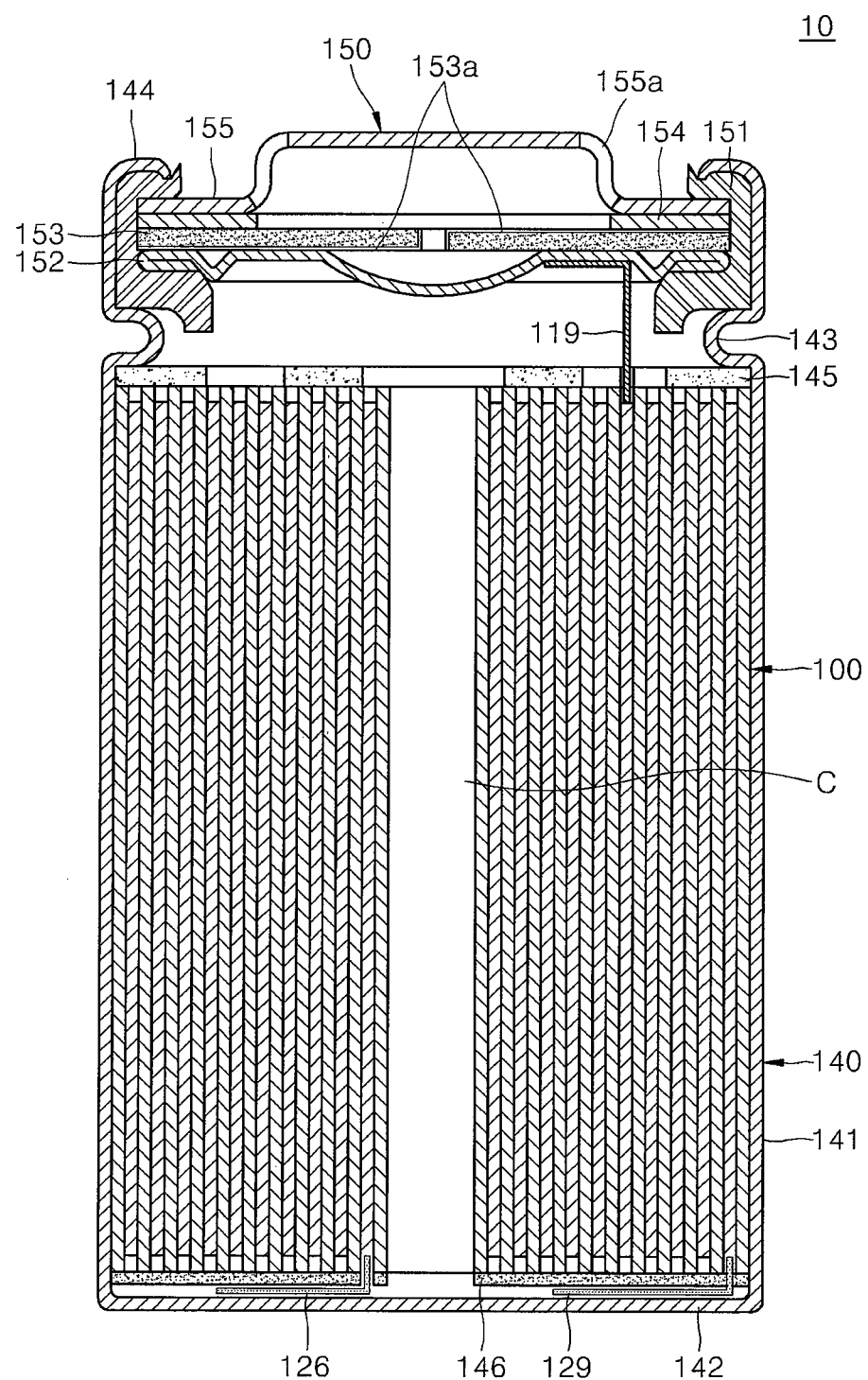
FIG. 2 is a schematic cross-sectional view taken along the line I-I of FIG. 1.
Figure 3:
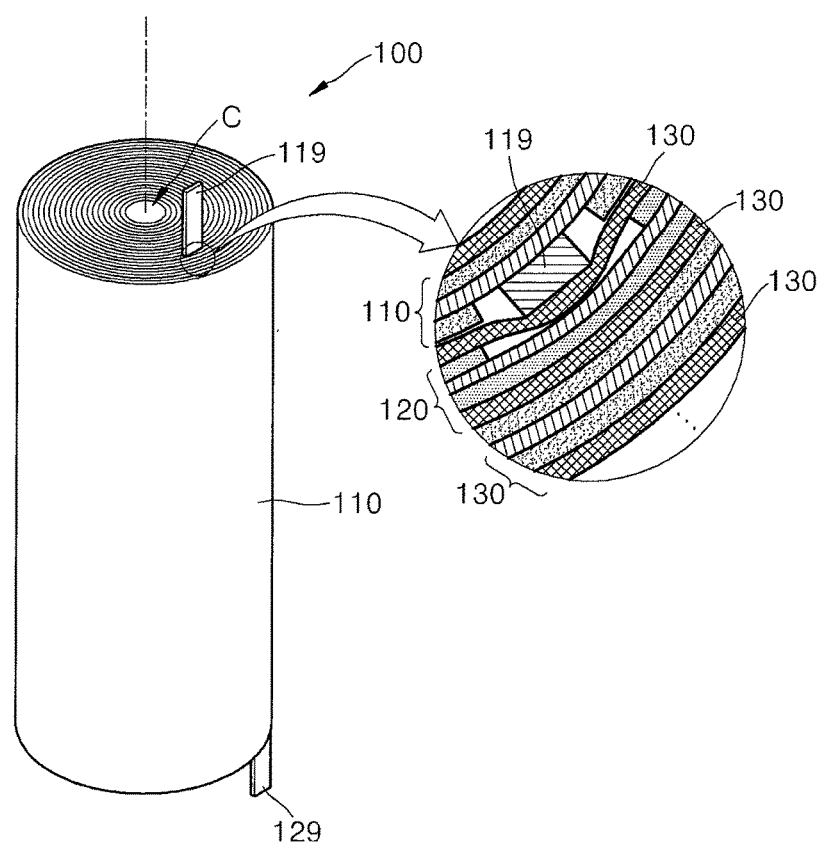
FIG. 3 is a schematic perspective view illustrating an electrode assembly of the secondary battery illustrated in FIG. 2.

FIG. 1 is a schematic perspective view illustrating a secondary battery 10 according to an embodiment of the present invention, and FIG. 2 is a schematic cross-sectional view taken along the line I-I of FIG. 1. FIG. 3 is a schematic perspective view illustrating an electrode assembly 100 of the secondary battery 10 illustrated in FIG. 2, and FIG. 4 is a view schematically illustrating components of the electrode assembly 100 illustrated in FIG. 3.

Referring to FIGS. 1 to 4, the secondary battery 10 of an embodiment of the present invention may include the electrode assembly 100, a can 140 accommodating the electrode assembly 100, and a cap assembly 150 for sealing the can 140.

Figure 4:
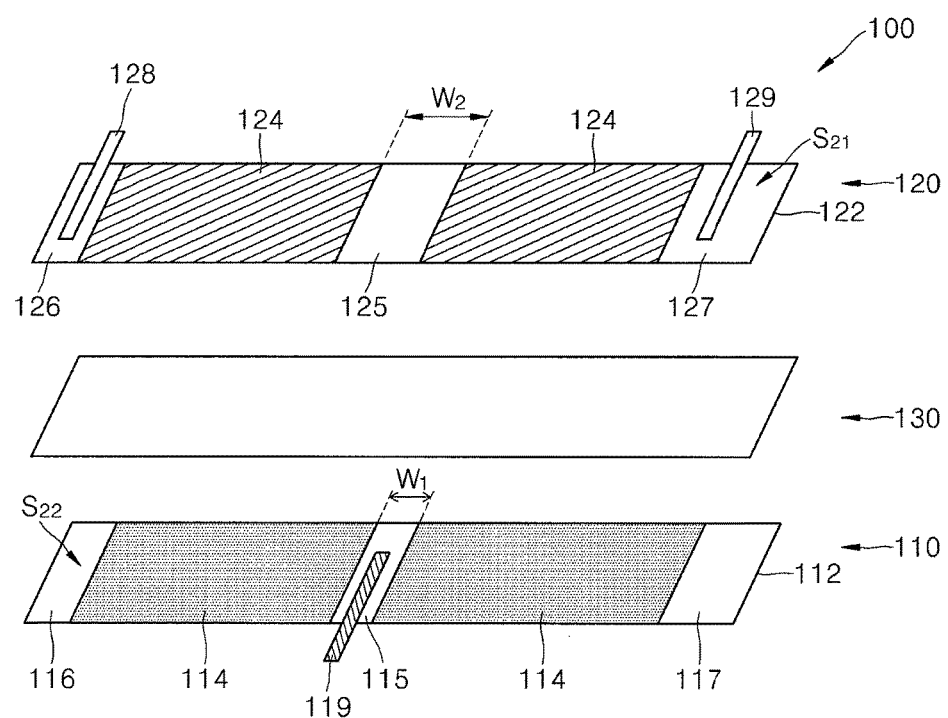
FIG. 4 is a view schematically illustrating components of the electrode assembly illustrated in FIG. 3.

Referring to FIG. 4, the electrode assembly 100 may include a positive electrode plate 110, a negative electrode plate 120, and a separator 130 disposed between the positive and negative electrode plates 110 and 120.

The positive electrode plate 110 may include a positive electrode collector 112, positive electrode coating portions 114 formed by coating at least a first side $S_{22}$ of the positive electrode collector 112 with a positive electrode active material, and a first positive electrode non-coating portion 115 that is not coated with the positive electrode active material (e.g., the first positive electrode non-coating portion 115 may be an exposed portion of the positive electrode collector 112).

The positive electrode collector 112 may be formed of a metallic material, such as aluminum, stainless steel, titanium, copper, silver, or a combination thereof.

The positive electrode coating portions 114 may be formed by coating the positive electrode collector 112 with the positive electrode active material. The positive electrode coating portions 114 may include a binder and a conducting agent in addition to the positive electrode active material.

The positive electrode active material may be a material capable of reversibly intercalating and deintercalating lithium ions. For example, the positive electrode active material may include at least one material selected from the group consisting of lithium transition metal oxides, such as lithium cobalt oxide, lithium nickel oxide, lithium nickel cobalt oxide, lithium nickel cobalt aluminum oxide, lithium nickel cobalt manganese oxide, lithium manganese oxide, and lithium iron phosphate; nickel sulfides; copper sulfides; sulfur; iron oxides; vanadium oxides; and combinations thereof.

The binder may include at least one material selected from the group consisting of polyvinylidene fluoride-containing binders, such as polyvinylidene fluoride, vinylidene fluoride/hexafluoropropylene copolymer, and vinylidene fluoride/tetrafluoroethylene copolymer; carboxymethyl cellulose-containing binders, such as sodium-carboxymethyl cellulose and lithium-carboxymethyl cellulose; acrylate-containing binders, such as polyacrylic acid, lithium-polyacrylic acid, acrylic, polyacrylonitrile, polymethyl methacrylate, and poly(butyl acrylate); polyimide-imides; polytetrafluoroethylene; polyethylene oxide; polypyrrole; lithium-Nafion; styrene butadiene rubber-containing polymers; and combinations thereof.

The conducting agent may include at least one material selected from the group consisting of carbon-containing conducting agents, such as carbon black, carbon fiber, and graphite; conductive fiber, such as metal fiber; metal powder, such as carbon fluoride powder, aluminum powder, and nickel powder; conductive whisker, such as zinc oxides and potassium titanate; conductive metal oxides, such as titanium oxides; conductive polymers, such as polyphenylene derivatives; and combinations thereof.

The first positive electrode non-coating portion 115 may be located between both ends of the positive electrode plate 110 along a length direction of the positive electrode plate 110. For example, a distance from an end of the positive electrode plate 110 to a center of the first positive electrode non-coating portion 115 may be about ⅓ to about ⅔ of the length of the positive electrode plate 110. Therefore, the positive electrode coating portions 114 may be located at both sides of the first positive electrode non-coating portion 115.

A positive electrode tab 119 may be coupled to (e.g., attached to) the first positive electrode non-coating portion 115. The positive electrode tab 119 may be formed of a material having high electrical conductivity. For example, the positive electrode tab 119 may be formed of copper (Cu) or a copper alloy. The positive electrode tab 119 may be coupled to the first positive electrode non-coating portion 115 by various methods, such as ultrasonic welding, resistance welding, and laser welding methods.

As described above, the first positive electrode non-coating portion 115 is located between both ends of the positive electrode plate 110 (e.g., both ends of the positive electrode plate 110 along the length direction thereof), and the positive electrode tab 119 having high electrical conductivity is coupled to the first positive electrode non-coating portion 115. Therefore, during an electrochemical reaction in the secondary battery 10, electrons may travel a relatively short distance (e.g., a relatively short distance to the first positive electrode non-coating portion 115), and the positive electrode tab 119 may remain relatively cool (e.g., be heated less) owing to its low electrical resistance.

The positive electrode plate 110 may further include a second positive electrode non-coating portion 116 at an end thereof and a third positive electrode non-coating portion 117 at the other end thereof. The second and third positive electrode non-coating portions 116 and 117 may overlap second and third negative electrode non-coating portions 126 and 127 (further described later), respectively.

The positive electrode active material may also be applied to a second side of the positive electrode collector 112 that is opposite to the first side $S_{22}$. In this case, the capacity of the secondary battery 10 may be increased owing to an increased positive electrode coating area.

The negative electrode plate 120 may include a negative electrode collector 122, negative electrode coating portions 124 formed by coating at least a first side $S_{21}$ of the negative electrode collector 122 with a negative electrode active material, and a first negative electrode non-coating portion 125 that is not coated with the negative electrode active material (e.g., the first negative electrode non-coating portion 125 may be an exposed portion of the negative electrode collector 122). The first side $S_{21}$ of the negative electrode collector 122 is a side facing the first side $S_{22}$ of the positive electrode collector 112. In FIG. 4, the first side $S_{21}$ of the negative electrode collector 122 and the first side $S_{22}$ of the positive electrode collector 112 are illustrated facing in the same direction for clarity of illustration. However, the first side $S_{21}$ of the negative electrode collector 122 faces the first side $S_{22}$ of the positive electrode collector 112, as shown in FIG. 3.

The negative electrode collector 122 may include at least one metal selected from the group consisting of copper, stainless steel, nickel, aluminum, and titanium.

The negative electrode coating portions 124 may be formed by coating the negative electrode collector 122 with the negative electrode active material. The negative electrode coating portions 124 may include a binder and a conducting agent in addition to the negative electrode active material. The negative electrode active material may also be applied to a second side of the negative electrode collector 122 that is opposite to the first side $S_{21}$.

The negative electrode active material may be a material capable of forming an alloy together with lithium or capable of reversibly intercalating and deintercalating lithium. For example, the negative electrode active material may include at least one material selected from the group consisting of metals, carbon-containing materials, metal oxides, lithium metal nitrides, and combinations thereof.

The metals may include at least one selected from the group consisting of lithium, silicon, magnesium, calcium, aluminum, germanium, tin, lead, arsenic, antimony, bismuth, silver, gold, zinc, cadmium, mercury, copper, iron, nickel, cobalt, indium, and combinations thereof.

The carbon-containing materials may include at least one material selected from the group consisting of graphite, graphite carbon fiber, coke, mesocarbon microbeads (MC-MBs), polyacene, pitch-derived carbon fiber, hard carbon, and combinations thereof.

The metal oxides may include at least one selected from the group consisting of lithium titanium oxides, titanium oxides, molybdenum oxides, niobium oxides, iron oxides, tungsten oxides, tin oxides, amorphous tin oxide composites, silicon monoxide, cobalt oxides, and nickel oxides.

The binder and the conducting agent may be the same as the binder and the conducting agent included in the positive electrode active material.

The separator 130 may be disposed between the positive electrode plate 110 and the negative electrode plate 120 to insulate the positive electrode plate 110 and the negative electrode plate 120 from each other. For example, the separator 130 may be formed of a porous polymer film, such as a porous polyethylene film and a porous polypropylene film. However, the separator 130 is not limited thereto.

When an external short circuit occurs, a high current may flow through the positive electrode tab 119 of the secondary battery 10. In this case, the temperature of the positive electrode tab 119 may increase and the separator 130 may shrink or deform at a portion around the positive electrode tab 119 due to heat. In this case, a short circuit may be formed between the positive electrode plate 110 and the negative electrode plate 120. At this time, if the positive electrode tab 119 and the negative electrode coating portions 124 come into contact with each other, the resistance of the short circuit may be markedly increased causing accidents, such as burning or explosions of the secondary battery 10. Therefore, to prevent this, the first negative electrode non-coating portion 125 may overlap the first positive electrode non-coating portion 115 and may have a width $W_2$ that is greater than the width $W_1$ of the first positive electrode non-coating portion 115 in the length direction of the positive electrode plate 110.

When the first negative electrode non-coating portion 125 overlaps the first positive electrode non-coating portion 115 to which the positive electrode tab 119 is attached, although a short circuit is formed between the positive electrode plate 110 and the negative electrode plate 120 because the separator 130 shrinks or becomes damaged by heat at a portion around the positive electrode plate 110, the positive electrode tab 119 may come into contact with the first negative electrode non-coating portion 125. Therefore, the short circuit may have relatively low resistance, and thus, burning or explosions of the secondary battery 10 may be prevented.

In addition, when the width $W_2$ of the first negative electrode non-coating portion 125 is greater than the width $W_1$ of the first positive electrode non-coating portion 115, the first negative electrode non-coating portion 125 and the first positive electrode non-coating portion 115 may overlap each other although errors occur during a manufacturing process of the electrode assembly 100 (e.g., misalignment of the positive and negative electrode plates 110 and 120). The width $W_1$ of the first positive electrode non-coating portion 115 and the width $W_2$ of the first negative electrode non-coating portion 125 may be variously set according to the position of the first positive electrode non-coating portion 115 and dimensional tolerances of the electrode assembly 100.

The positive electrode plate 110, the separator 130, and the negative electrode plate 120 may be wound together in the form of a jelly roll. At this time, the first side $S_{22}$ of the positive electrode collector 112, on which the first positive electrode non-coating portion 115 is formed, may face the first side $S_{21}$ of the negative electrode collector 122, on which the first negative electrode non-coating portion 125 is formed. Thus, the thickness of the positive electrode tab 119 may be accommodated, and the positive electrode plate 110 and the negative electrode plate 120 wound together with the positive electrode tab 119 therebetween may not be pressed by the positive electrode tab 119.

For example, referring to FIG. 3, a portion of the separator 130 covering (e.g., overlapping) the positive electrode tab 119 is pushed outward due to the thickness of the positive electrode tab 119. However, because the positive electrode tab 119 is accommodated between the first positive electrode non-coating portion 115 and the first negative electrode non-coating portion 125 which face and overlap each other, the positive electrode plate 110 and the negative electrode plate 120 may be wound together with the positive electrode tab 119 therebetween without being pressed by the positive electrode tab 119. Therefore, stress may not be concentrated on portions of the positive electrode coating portions 114 and the negative electrode coating portions 124 due to overlapping with the positive electrode tab 119, and thus, the positive electrode coating portions 114 and the negative electrode coating portions 124 may not be cracked or separated.

Referring to FIG. 4, the negative electrode plate 120 may include the second negative electrode non-coating portion 126 at an end and the third negative electrode non-coating portion 127 at the other end. A first negative electrode tab 128 may be attached to the second negative electrode non-coating portion 126, and a second negative electrode tab 129 may be attached to the third negative electrode non-coating portion 127. For example, the first and second negative electrode tabs 128 and 129 may be formed of nickel and may be respectively attached to the second and third negative electrode non-coating portions 126 and 127 by various methods, such as ultrasonic welding, resistance welding, and laser welding methods.

When the second and third negative electrode non-coating portions 126 and 127 are formed at respective ends of the negative electrode plate 120 as described above, electrons may travel a relatively short distance (e.g., may travel a relatively short distance to the first and second negative electrode tabs 128 and 129), thereby improving high-rate discharge characteristics of the secondary battery 10 and reducing or minimizing heating caused by a current.

In addition, the second negative electrode non-coating portion 126 may overlap the second positive electrode non-coating portion 116, and the third negative electrode non-coating portion 127 may overlap the third positive electrode non-coating portion 117. Therefore, the thickness of the first negative electrode tab 128 and the thickness of the second negative electrode tab 129 may be accommodated and may not press the positive and negative electrode plates 110 and 120 when the positive and negative electrode plates 110 and 120 are wound together with the first and second negative electrode tabs 128 and 129 therebetween.

The first and second negative electrode tabs 128 and 129 may protrude outward from the electrode assembly 100 in a direction that is opposite to the direction in which the positive electrode tab 119 protrudes outward from the electrode assembly 100. In this case, a short circuit between the first negative electrode tab 128 and the positive electrode tab 119 and a short circuit between the second negative electrode tab 129 and the positive electrode tab 119 may be effectively prevented.

The electrode assembly 100 may further include a center pin C in a center region thereof and may be accommodated in the can 140 as shown in FIG. 2.

The center pin C may prevent deformation of the electrode assembly 100 when the secondary battery 10 is charged or discharged. The center pin C may have a hollow, cylindrical shape. However, the center pin C is not limited thereto. For example, the center pin may be a solid pin.

The can 140 may be formed of steel, stainless steel, aluminum, or an equivalent material thereof. The can 140 may include a lateral side 141 and a bottom side 142 formed as or from one piece (e.g., formed from a single piece), and an opening may be formed at or through an upper side of the can 140. The electrode assembly 100 may be inserted into the can 140 through the opening of the can 140, and the cap assembly 150 may be coupled to the opening to seal the can 140. For example, the can 140 may have a cylindrical shape similar to the electrode assembly 100.

An electrolyte may be filled in the can 140 together with the electrode assembly 100. The electrolyte may be a nonaqueous electrolyte formed by mixing a lithium salt and a high-purity organic solvent. In another example, the electrolyte may be a polymer electrolyte. However, the embodiments of the present invention are not limited thereto. That is, the electrolyte may be selected from various kinds of suitable electrolytes that are known to those skilled in the art.

An upper insulator 145 and a lower insulator 146 may be respectively disposed on upper and lower sides of the electrode assembly 100 accommodated in the can 140. The upper insulator 145 may insulate the upper side of the electrode assembly 100 from the cap assembly 150, and the lower insulator 146 may insulate the lower side of the electrode assembly 100 from the bottom side of the can 140.

The upper insulator 145 and the lower insulator 146 may absorb the electrolyte and expand in a direction perpendicular to the winding direction of the electrode assembly. Therefore, movement of the electrode assembly 100 in the can 140 may be reduced or prevented by the expansion of the upper insulator 145 and the lower insulator 146. The upper insulator 145 and the lower insulator 146 may be formed of polyethylene terephthalate (PET) or polyvinylidene fluoride (PVDF). However, the upper insulator 145 and the lower insulator 146 are not limited thereto.

The positive electrode tab 119 may be coupled to (e.g., connected to) the cap assembly 150 through the upper insulator 145, and the first and second negative electrode tabs 128 and 129 may be coupled to the can 140 through the lower insulator 146.

A beading part 143 may be formed by recessing a portion of the can 140 that is located below the cap assembly 150 inwardly toward the center of the cap assembly 150, and a crimping part 144 may be formed by inwardly bending a portion of the can 140 that is located above the cap assembly 150. The beading part 143 and the crimping part 144 may firmly fix the cap assembly 150 to the can 140 and support the cap assembly 150, thereby preventing separation of the cap assembly 150 and leakage of the electrolyte.

The cap assembly 150 may include a gasket 151, a safety vent 152, a circuit board 153, a positive temperature coefficient (PTC) device 154, and a positive electrode cap 155. The cap assembly 150 may be disposed on the upper side of the can 140 having a cylindrical shape.

The gasket 151 may have a ring shape and may be disposed on or along a side of the cylindrical can 140. At this time, the safety vent 152, which is conductive and coupled with the positive electrode tab 119, may be coupled to the gasket 151, which is insulative. When the inside pressure of the can 140 increases, the safety vent 152 deforms and/or fractures to break the circuit board 153 and/or discharge gas from the inside of the can 140.

The circuit board 153 is disposed on a side of the safety vent 152 and is fractured or broken to interrupt a current when the safety vent 152 is deformed. The PTC device 154 is disposed on an upper side of the circuit board 153 to interrupt an overcurrent.

The positive electrode cap 155 is disposed on a side of the PTC device 154 to provide a positive voltage to an external device. The positive electrode cap 155 may include a plurality of vent holes 155a to allow discharge of gas. The safety vent 152, the circuit board 153, the PTC device 154, and the positive electrode cap 155 are disposed inside the insulative gasket 151 to prevent a short circuit with the can 140. In addition, a wire pattern 153a is formed on the circuit board 153, and the wire pattern 153a is cut when the circuit board 153 is fractured or broken.

As described above, according to the one or more of the above embodiments of the present invention, although an internal short circuit is formed in the secondary battery, the resistance of the internal short circuit may be reduced and/or minimized to prevent explosion or burning of the secondary battery.

It should be understood that the example embodiments described herein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and their equivalents.

What is claimed is:

1. An electrode assembly comprising:
   a positive electrode plate comprising a positive electrode collector having a positive electrode coating portion and a first positive electrode non-coating portion at a first side thereof, the positive electrode coating portion having a positive electrode active material thereon, the first positive electrode non-coating portion being an exposed portion of the positive electrode collector;
   a positive electrode tab coupled to the first positive electrode non-coating portion;
   a negative electrode plate comprising a negative electrode collector having a negative electrode coating portion and a first negative electrode non-coating portion at a first side thereof, the negative electrode coating portion having a negative electrode active material thereon and facing the first side of the positive electrode collector, the first negative electrode non-coating portion being an exposed portion of the negative electrode collector; and
   a separator between the positive electrode plate and the negative electrode plate,
   wherein the first positive electrode non-coating portion is offset from ends of the positive electrode plate along a length direction of the positive electrode plate,
   the positive electrode plate, the separator, and the negative electrode plate are wound together about a winding axis in a jelly-roll shape,
   the first negative electrode non-coating portion overlaps the first positive electrode non-coating portion such that the first negative electrode non-coating portion and the first positive electrode non-coating portion are directly adjacent opposite sides of a portion of the separator in a direction from a center of the jelly-roll shape to an outer surface thereof, and the first positive electrode non-coating portion extends entirely across the positive electrode plate in a width direction of the positive electrode plate, the width direction being parallel to the winding axis and perpendicular to the length direction.

2. The electrode assembly of claim 1, wherein a size of the first positive electrode non-coating portion along the length direction of the positive electrode plate is less than a size of the first negative electrode non-coating portion along a length direction of the negative electrode plate.

3. The electrode assembly of claim 2, wherein the positive electrode tab comprises copper.

4. The electrode assembly of claim 2, wherein the positive electrode plate further comprises a second positive electrode non-coating portion and a third positive electrode non-coating portion at opposite ends of the positive electrode plate, respectively, along the length direction of the positive electrode plate, the negative electrode plate further comprises a second negative electrode non-coating portion and a third negative electrode non-coating portion that overlap the second positive electrode non-coating portion and the third positive electrode non-coating portion, respectively, and negative electrode tabs are coupled to the second and third negative electrode non-coating portions, respectively.

5. The electrode assembly of claim 4, wherein the positive electrode tab protrudes from the electrode assembly in a direction that is opposite to a direction in which the negative electrode tabs protrude from the electrode assembly.

6. The electrode assembly of claim 2, wherein the electrode assembly further comprises a center pin at the center of the jelly-roll shape.

7. The electrode assembly of claim 2, wherein a second side of the positive electrode collector has the positive electrode active material thereon, and a second side of the negative electrode collector has the negative electrode active material thereon.

8. The electrode assembly of claim 2, wherein a distance from one of the ends of the positive electrode plate to a center of the first positive electrode non-coating portion is ⅓ to ⅔ the length of the positive electrode plate.

9. A secondary battery comprising:
a electrode assembly comprising a positive electrode plate, a negative electrode plate, and a separator between the positive electrode plate and the negative electrode plate;
a can accommodating the electrode assembly; and
a cap assembly coupled to an upper side of the can,
wherein the positive electrode plate comprises a positive electrode collector having a positive electrode coating portion and a first positive electrode non-coating portion at a first side thereof, the positive electrode coating portion having a positive electrode active material thereon, the first positive electrode non-coating portion being an exposed portion of the positive electrode collector,
wherein the negative electrode plate comprises a negative electrode collector having a negative electrode coating portion and a first negative electrode non-coating portion at a first side thereof facing the first side of the positive electrode collector, the negative electrode coating portion having a negative electrode active material thereon, the first negative electrode non-coating portion being an exposed portion of the negative electrode collector, wherein the positive electrode plate, the separator, and the negative electrode plate are wound together in a jelly-roll shape, and wherein the first negative electrode non-coating portion overlaps the first positive electrode non-coating portion such that the first negative electrode non-coating portion and the first positive electrode non-coating portion are directly adjacent opposite sides of a portion of the separator from a center of the jelly-roll shape to an outer surface thereof in a direction perpendicular to a winding direction of the electrode assembly, a positive electrode tab is coupled to the first positive electrode non-coating portion, and the first negative electrode non-coating portion has a width that is greater than a width of the first positive electrode non-coating portion.

10. The secondary battery of claim 9, wherein the first positive electrode non-coating portion is between ends of the positive electrode plate along a length direction of the positive electrode plate.

11. The secondary battery of claim 10, wherein a distance from one of the ends of the positive electrode plate to a center of the first positive electrode non-coating portion is ⅓ to ⅔ the length of the positive electrode plate.

12. The secondary battery of claim 9, wherein the secondary battery further comprises a center pin at the center of the jelly-roll shape.

13. The secondary battery of claim 9, wherein the positive electrode tab comprises copper.

14. The secondary battery of claim 9, wherein the positive electrode plate further comprises a second positive electrode non-coating portion and a third positive electrode non-coating portion at opposite ends of the positive electrode plate, respectively, along a length direction of the positive electrode plate, the negative electrode plate further comprises a second negative electrode non-coating portion and a third negative electrode non-coating portion that overlap the second positive electrode non-coating portion and the third positive electrode non-coating portion, respectively, and negative electrode tabs are coupled to the second and third negative electrode non-coating portions, respectively.

15. The secondary battery of claim 14, further comprising:
an upper insulator at an upper side of the electrode assembly; and
a lower insulator at a lower side of the electrode assembly.

16. The secondary battery of claim 15, wherein the positive electrode tab protrudes from the electrode assembly in a direction that is opposite to a direction in which the negative electrode tabs protrude from the electrode assembly.

17. The secondary battery of claim 16, wherein the positive electrode tab is coupled to the cap assembly through the upper insulator, and each of the negative electrode tabs is coupled to the can through the lower insulator.

18. The secondary battery of claim 9, wherein a second side of the positive electrode collector has the positive electrode active material thereon, and a second side of the negative electrode collector has the negative electrode active material thereon.

19. The secondary battery of claim 9, wherein the can has a cylindrical shape.

* * * * *